(150.)
TRUCKSON S. LA FRANCE.
Improvement in Rotary Engines.
No. 122,033.     Fig. 1.     Patented Dec. 19, 1871.
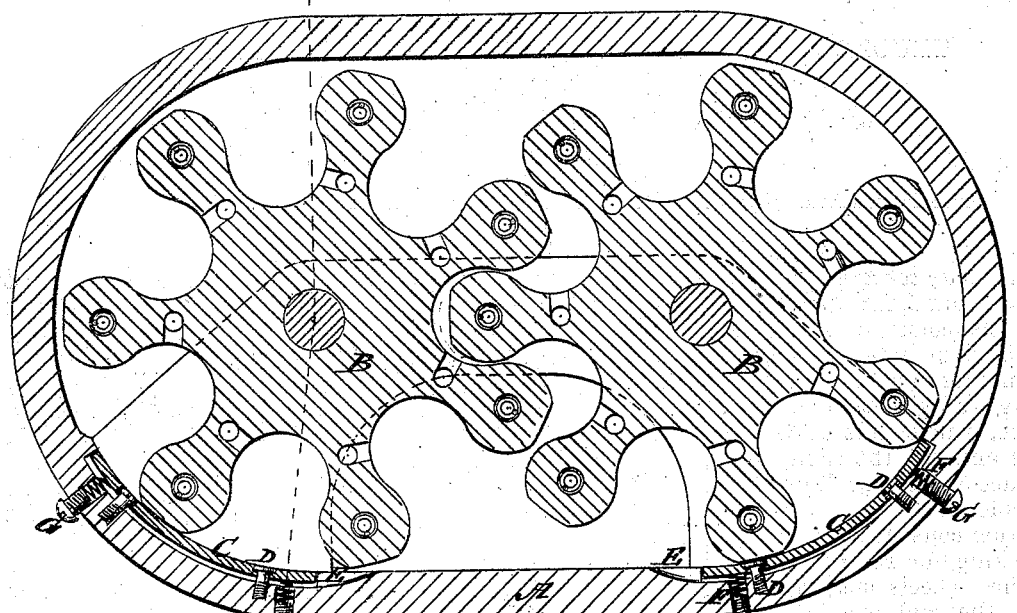
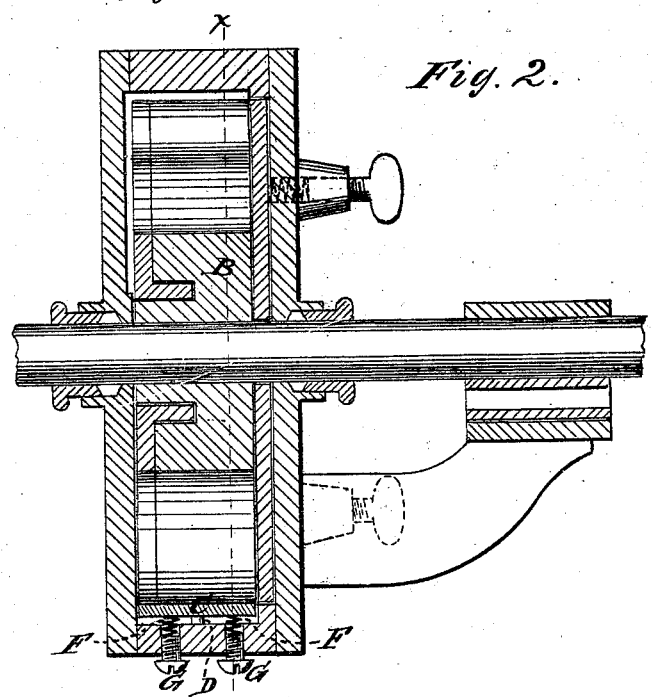
Fig. 2.
Witnesses:
E. Wolff.
Francis McArdle
Inventor:
T. S. La France
Per ——— Attorneys.

UNITED STATES PATENT OFFICE.

TRUCKSON S. LA FRANCE, OF ELMIRA, NEW YORK.

IMPROVEMENT IN ROTARY ENGINES.

Specification forming part of Letters Patent No. 122,033, dated December 19, 1871.

*To all whom it may concern:*

Be it known that I, TRUCKSON S. LA FRANCE, of Elmira, in the county of Chemung and State of New York, have invented certain Improvements in Rotary Engines; and I do hereby declare that the following is a full, clear, and exact description thereof, which will enable others skilled in the art to make and use the same, reference being had to the accompanying drawing forming part of this specification.

My invention consists in an improved arrangement of packing for rotary engines, in which a pair of toothed wheels meshing with each other is employed, the said packing being a concave plate for each wheel set into the case to act against the ends of the teeth and prevent the escape of steam from the receiving-port over the teeth, the said pieces being arranged to be held against the said teeth by the elastic pressure of steam or springs, all as hereinafter described.

Figure 1 is a sectional elevation of an engine provided with my improved packing, the section being taken on the line $x\,x$ of Fig. 2; and Fig. 2 is a section taken on the line $y\,y$ of Fig. 1.

Similar letters of reference indicate corresponding parts.

A represents the case, and B the pair of toothed wheels or pistons, such as commonly used. C represents a concave packing-plate for each, let into the wall of the case to pack the faces of the said wheels or the ends of the teeth to prevent the steam from passing around the wrong way. The said plates are confined in the recesses provided for them both by the walls thereof and by screws D—that is, they are prevented from moving endwise or sidewise, but they have freedom to move toward or from the ends of the teeth—the heads of the screws D not being screwed quite down to the bottoms of the countersunk cavities for them; and a little space is provided behind each plate, with a groove, E, leading from the live-steam side to said space for the admission of steam to press them against the ends of the teeth; or springs F, with adjusting-screws G, may be used in connection with the steam.

Having thus described my invention, what I claim as new, and desire to secure by Letters Patent, is—

In rotary engines, where toothed and meshing-wheels are employed, the packings C let into the case at intervals therearound, and having the channels E behind them, as and for the purpose set forth.

TRUCKSON S. LA FRANCE.

Witnesses:
   N. P. FASSETT,
   A. ROBERTSON. (150)